United States Patent [19]

Vaccaro et al.

[11] Patent Number: 5,804,053
[45] Date of Patent: Sep. 8, 1998

[54] CONTINUOUSLY ELECTROPLATED FOAM OF IMPROVED WEIGHT DISTRIBUTION

[75] Inventors: Anthony J. Vaccaro, Sugarland, Tex.; Janet S. Gregg; Daniel W. Gibbons, both of Mentor, Ohio; James R. Brannan, Perry, Ohio; Gerald R. Pohto, Mentor, Ohio; Jean M. Hinden, Chambesy, Switzerland

[73] Assignee: ELTECH Systems Corporation, Chardon, Ohio

[21] Appl. No.: 738,080

[22] Filed: Oct. 25, 1996

Related U.S. Application Data

[60] Provisional application No. 60/008,326, Dec. 7, 1995.

[51] Int. Cl.⁶ .................... C25D 7/06; C25D 5/54; C25D 17/00
[52] U.S. Cl. .................. 205/138; 205/161; 204/206
[58] Field of Search .................. 205/138, 161; 204/206

[56] References Cited

U.S. PATENT DOCUMENTS

| | | | |
|---|---|---|---|
| 2,541,721 | 2/1951 | Roehl et al. | 204/49 |
| 3,007,856 | 11/1961 | Knapp et al. | 204/49 |
| 3,265,526 | 8/1966 | Beer | 117/50 |
| 3,549,505 | 12/1970 | Hanusa | 204/11 |
| 3,632,495 | 1/1972 | Beer | 204/290 F |
| 3,694,325 | 9/1972 | Katz et al. | 204/11 |
| 3,711,385 | 1/1973 | Beer | 204/59 |
| 4,022,679 | 5/1977 | Koziol et al. | 204/286 |
| 4,045,304 | 8/1977 | Tezuka et al. | 204/49 |
| 4,251,603 | 2/1981 | Matsumoto et al. | 429/94 |
| 4,326,931 | 4/1982 | Kamijo et al. | 204/22 |
| 4,500,647 | 2/1985 | Solomon | 502/101 |
| 4,528,084 | 7/1985 | Beer et al. | 204/290 F |
| 4,601,794 | 7/1986 | Tsuda et al. | 204/15 |
| 4,853,101 | 8/1989 | Hruska et al. | 204/296 |
| 4,859,291 | 8/1989 | Takada et al. | 204/49 |
| 4,877,694 | 10/1989 | Solomon et al. | 429/27 |
| 4,927,514 | 5/1990 | Solomon et al. | 204/290 R |
| 4,936,971 | 6/1990 | Pohto | 204/242 |
| 4,978,431 | 12/1990 | Brannan et al. | 204/28 |
| 5,082,538 | 1/1992 | DeRespiris et al. | 205/140 |
| 5,098,544 | 3/1992 | Brannan et al. | 204/206 |
| 5,300,165 | 4/1994 | Sugikawa | 156/150 |
| 5,374,491 | 12/1994 | Brannan et al. | 429/218 |

FOREIGN PATENT DOCUMENTS

| | | |
|---|---|---|
| 0071119 | 7/1982 | European Pat. Off. . |
| 7458227 | 5/1974 | Japan . |

OTHER PUBLICATIONS

Chemical Abstracts, vol. 84, No. 24, Jun. 14, 1976, p. 464, abstract No. 171494c.

International Search Report re PCT/US/96 17121, Dated Mar. 14, 1997.

*Primary Examiner*—Kathryn L. Gorgos
*Assistant Examiner*—Edna Wong
*Attorney, Agent, or Firm*—John J. Freer; David J. Skrabec; Michele M. Tyrpak

[57] ABSTRACT

A process is disclosed, as well as apparatus useful therefor, for continuously electroplating a strip of reticulated foam using multiple electroplating zones that each contain electroplating bath. In each zone there is a cathode and an anode. In at least one electroplating zone there is an insoluble anode, typically as the sole anode. In some of the electroplating zones soluble anodes may be used. As a first cathode, there can be provided a cathode roll outside of the electroplating bath. The reticulated foam is guided in the bath past the anodes, as well as past cathodes, e.g., including a cathode roll which may be positioned outside of the bath. The resulting electroplated foam emerging from the bath has an improved electroplate weight distribution and the process achieves enhanced efficiencies and economies of operation.

37 Claims, 3 Drawing Sheets

5,804,053

CONTINUOUSLY ELECTROPLATED FOAM OF IMPROVED WEIGHT DISTRIBUTION

CROSS-REFERENCE TO RELATED APPLICATION

This application claims the benefit of previously filed U.S. Provisional Application Serial No. 60/008,326, filed Dec. 7, 1995, and assigned to the assignee of the present application.

BACKGROUND OF THE INVENTION

Metallic porous foams generally in sheet form are used in the preparation of high-density, high-capacity battery electrodes. These can be utilized for making electrodes for batteries such as nickel cadmium and nickel metal hydride batteries.

In preparing the metallic porous sheet, there may be employed a sponge-like plastic foam having open cells. A polyurethane foam is exemplary of such a starting material. The plastic foam, often in strip form, is usually pretreated to have threshold electrical conductivity. Electroless plating and coating with conductive carbon paints are exemplary of pretreatment processes. Then the metallic porous sheet can be prepared from the pretreated foam such as by electroplating.

An active material is impregnated into the metal foam sheet. This can be a material such as nickel hydroxide and it is impregnated into the metal foam sheet as a paste. In the battery electrode application, the metal sheet is generally wound into cylindrical form. Thus, the sheet should have the requisite physical properties to not cause problems, e.g., cracking, in such operation.

In the development of preparing the metal foam sheet from the plastic foam starting material, U.S. Pat. No. 3,549,505 discloses a process of rupturing cellular polyurethane cells and pretreating the resulting polyurethane, by spray application, with finely divided graphite or iron to provide electrical conductivity. The resulting conductive polyurethane foam is then metallized in an electroplating cell. The step is carried out on a batch basis by immersing a desired length of the electrically conductive product in the metallizing bath.

In somewhat similar manner, U.S. Pat. No. 3,694,325 discloses a batch process for electrolessly depositing metal onto a polyurethane foam, followed by plating the thus treated foam in a nickel-plating bath. However, the patent does not teach the plating process to be a continuous operation.

As the technology developed, the evolution of the processing included a change from batch processing to continuous operation. For example, U.S. Pat. No. 4,251,603 discloses coating a foamed resin with carbon black and then plating the coated resin in a Watts bath. It is suggested in the patent that the plating can be carried out continuously by pulling the foamed resin sponge in a longitudinal direction while being plated. However, no details on how to do this are given.

Then in U.S. Pat. No. 4,326,931 there is disclosed a continuous process for treating a porous starting material. The starting material is made electrically conductive by electroless plating. The resulting electrically conductive material is then passed continuously through an electrolytic bath around a rotary drum which functions as a cathode. The rotary drum cathode is partly immersed in the bath. An anode is immersed in the bath spaced from the cathode. A voltage applied between the rotary drum cathode and the anode causes the deposition of metal from the electrolytic bath onto the electrically conductive material.

In U.S. Pat. Nos. 4,978,431 and 5,098,544, there is taught the production of reticulated metal strip continuously, which process also uses reticulated foam which is semi-conductive and can be continuously electroplated. The strip of reticulated foam is introduced into the electroplating bath and the cathodic strip travels past the anode, which is immersed in the bath, to a cathode roll, which is positioned outside the bath. By this procedure, the strip achieves a partial plate, and this partial plate provides a current path between the anode and the cathode roll effective for sustaining the plating reaction in the electroplating bath.

As the development of the processing moved from batch to continuous operation, other aspects of the operation, in addition to continuous processing, were considered for improvement. One aspect of the overall matter which was investigated was the metal foam sheet itself. In U.S. Pat. No. 5,300,165 there is disclosed a method for continuously manufacturing a metallic porous sheet where the porous sheet is layered. This is taught as providing a metallic porous sheet having enhanced tensile strength. The layered sheet can comprise an easily deformed foamed sheet, layered onto a less readily deformed sheet mesh.

Another aspect that has been investigated is to improve the filling density of the metal foam sheet. As taught in U.S. Pat. No. 5,374,491 this can be done, where the metallic foam sheet is produced in continuous operation, in two zones, including a pre-plating first zone and a main plating zone. Attention is directed in the process to the metal electrodeposition weight in the first zone as well as the current densities employed.

It is, however, important for improving the manufacturing method to enhance the line speed of the continuous electroplating operation. It would be desirable to not only enhance such line speed, but also to provide this feature coupled with additional favorable attributes for the metal foam sheet. One such characteristic would be improved weight distribution. If the metal foam sheet is non-uniform, there can be a problem that the resulting battery electrode will not be uniformly electrified. Improved weight distribution for the metal foam sheet produced at efficient line speed can provide sheets of reduced tendency toward cracking or damage, which sheets can accept a maximized amount of active material in electrode preparation. This can lead to batteries with desirably high capacity. Also as a result, desirable electrical conductivity is achieved, leading to augmented cell voltages during high battery current operation.

SUMMARY OF THE INVENTION

A process for continuously electroplating foam to provide an improved weight distribution for the plated foam has now been found. Consequently, the plated foam produced by the present process can be provided in sheets having a reduced tendency toward cracking or similar damage. Moreover, the process of the present invention couples this more desirable weight distribution and damage resistance with enhanced line speed of the continuous electroplating operation. This results in cost savings by way of increased production rates. Furthermore, such can be accomplished while achieving a decrease in overall energy usage. Thus, the cost savings are multiplied.

In one aspect, the invention is directed to a process for continuously electroplating a strip of reticulated foam and providing electroplated foam of improved weight distribution, in which process multiple electroplating zones are provided and each zone has an electroplating bath, a cathode and an anode and with the reticulated foam being introduced into the electroplating bath and guided in a path of travel past the anode and cathode of each electroplating zone. In this process, the invention is more particularly directed to the improvement comprising:

(a) providing a cathode roll outside of the electroplating bath as a first cathode;

(b) positioning an insoluble anode as the sole anode in one, but less than all, of the electroplating zones for the electroplating process;

(c) positioning at least one soluble anode within one, but less than all, of the electroplating zones for the electroplating process;

(d) guiding the reticulated foam in the electroplating bath in a path of travel past both the insoluble anode and the soluble anode, as well as past the cathode roll positioned outside of the electroplating bath; and (e) removing electroplated conductive reticulated foam of improved weight distribution from the electroplating bath.

In a related aspect to the above-defined process, the invention is directed to apparatus useful for such process, which apparatus includes the aforesaid cathode roll and guide means, as well as insoluble anode as sole anode in a first electroplating zone, plus at least one soluble anode in a subsequent electroplating zone.

In another aspect, the invention is directed to a process, substantially as hereinafter described, wherein an insoluble gas diffusion electrode is established as an insoluble anode. The invention also relates to apparatus for conducting the process of this aspect of the invention. In further regard to this aspect, the invention relates to apparatus wherein the gas diffusion electrode serves in the manner of a bipolar electrode, as well as relating to an electroplating process described herein and utilizing such bipolar electrode.

In yet another aspect, the invention is directed to apparatus for continuously electroplating a strip of reticulated foam, which apparatus has an electroplating zone including an anode, a cathode and an electroplating bath of electrolyte with the reticulated foam being introduced into the electroplating bath and guided in a path of travel past the anode of said electroplating zone, which apparatus comprises:

(a) a perforate, insoluble anode having a flat front face past which the strip of reticulated foam passes;

(b) a top manifold for removing electrolyte passing across the flat front face of the insoluble anode, such top manifold extending along an upper edge of the insoluble anode;

(c) a bottom manifold for introducing electrolyte to the flat front face of the insoluble anode, such bottom manifold extending along a lower edge of the insoluble anode; and (d) guide means for introducing the strip of reticulated foam into the bath and for guiding the strip past the insoluble anode and into contact with electrolyte flowing from the bottom manifold and across the flat front face of the insoluble anode and into the top manifold.

In a still further aspect, the invention is directed to a process for continuously electroplating a strip of reticulated foam and providing electroplated foam of improved weight distribution, in which process multiple electroplating zones are provided and each zone has an electroplating bath, a cathode and an anode and with the reticulated foam being introduced into the electroplating bath and guided in a path of travel past the anode and cathode of each electroplating zone, with the process comprising:

(a) providing a perforate, insoluble anode having a flat front face in at least one electroplating zone;

(b) introducing electrolyte into the insoluble anode zone along a bottom edge of the insoluble anode;

(c) flowing electrolyte introduced at such bottom edge across the flat front face of the insoluble anode;

(d) removing electrolyte passing along the flat front face of the insoluble anode at a top edge of the anode; and (e) guiding the reticulated foam in the electroplating bath in a path of travel past the flat front face of the insoluble anode as well as into contact with electrolyte flowing across the flat front face of the insoluble anode.

In another aspect, the invention is directed to apparatus for continuously electroplating a strip of reticulated foam and providing electroplated foam of improved weight distribution, which apparatus provides multiple electroplating zones, with each zone having an electroplating bath, a cathode and an anode and with the reticulated foam being introduced into the electroplating bath and guided in a path of travel past the anode and cathode of each electroplating zone, which apparatus comprises:

(a) a cathode roll outside of the electroplating bath as the first cathode;

(b) an insoluble anode in a first electroplating zone;

(c) means for supplying an electroplating bath electrolyte to the first electroplating zone; and (d) guide means for introducing the strip of reticulated foam into the electroplating bath supplied to the first electroplating zone for guiding the strip past the insoluble anode prior to engaging the strip with the first cathode roll and prior to guiding the strip to subsequent electroplating zones.

In an embodiment of the aspect of the invention described immediately hereinabove, the means for supplying electrolyte to the first electroplating zone can include electrolyte circulation means from, and to, an electrolyte replenishment zone. Moreover, the replenishment zone can comprise an electrolytic cell and such cell may contain a gas diffusion electrode.

DESCRIPTION OF THE PREFERRED EMBODIMENTS

Figure 1:
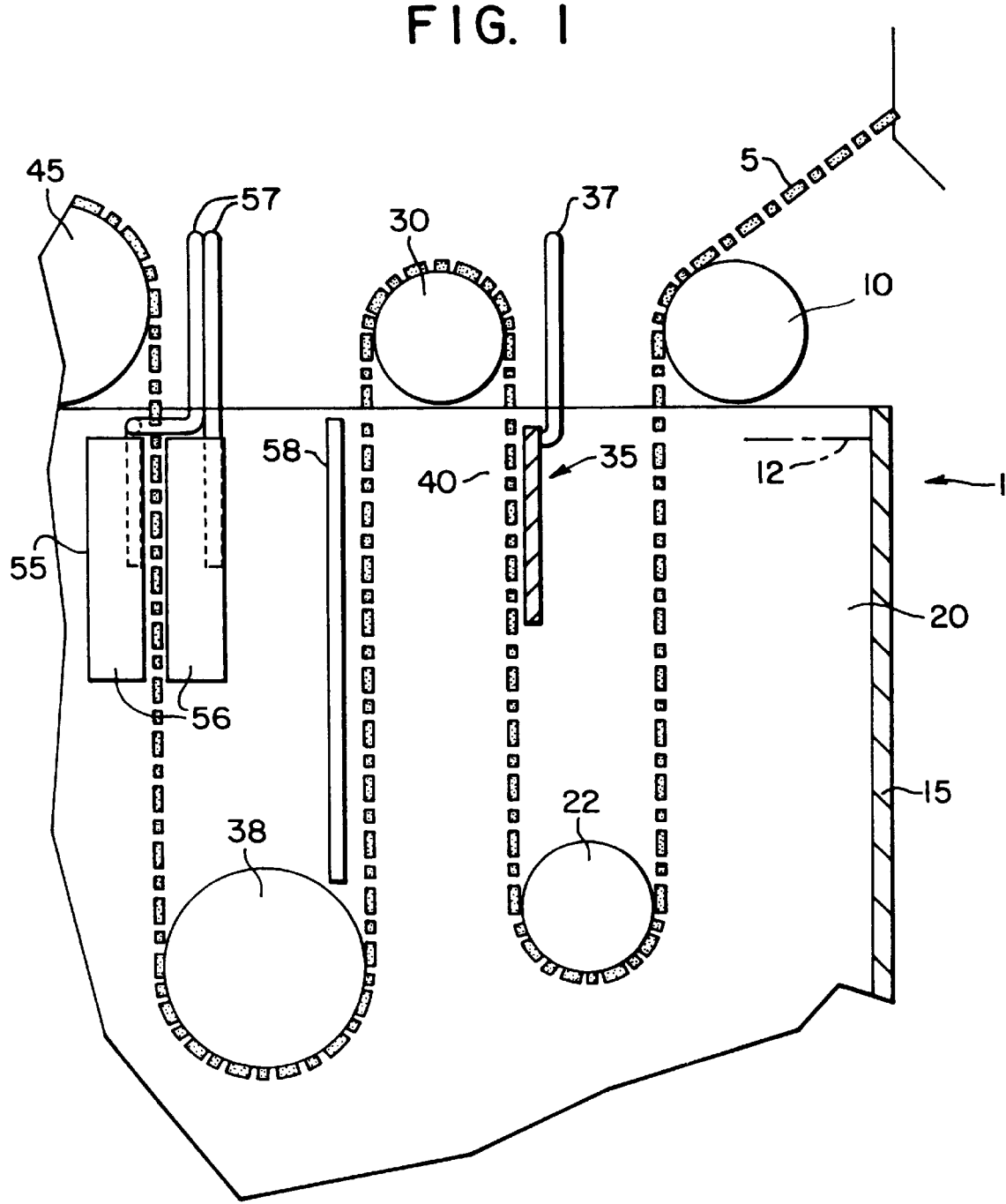
FIG. 1 is an enlarged elevation, partial section schematic view of a portion of the continuous plating apparatus representative of the present invention showing details of a first and second electroplating zone with an insoluble anode shown in the first zone.

FIG. 1 discloses a continuous plating apparatus 1 for plating a reticulate material in sheet form, which apparatus is representative of the plating apparatus of the present invention. In the figure, the apparatus 1 of the invention is shown generally in solid lines. A strip 5 of reticulated material in sheet form is shown in heavy dashed lines to show the path of travel of the strip 5. Referring to FIG. 1, the strip 5 of conductive reticulated material in sheet form is fed from a supply roll (not shown). The strip 5 of reticulated material is typically relatively flexible and capable of making a U-bend around a small diameter roll.

The strip 5 can comprise any of a variety of substrate materials and these may be activated, or made conductive, facilitating subsequent electroplating of the strip 5. The useful substrate materials include polymeric foams, carbon or graphite foams, silicate foams, aluminum foam and other organic or inorganic open-cellular materials. Synthetic or natural fibers, flexible paper or wood products, and leather can also be successfully electroplated with a metal in the process and apparatus of the present invention. The strip 5 of reticulate material in sheet form may be a mesh sheet or a nonwoven fabric sheet. Also, the strip 5 may be a sheet of adhered layers. For example, U.S. Pat. No. 5,300,165 discloses a useful porous sheet that is a plurality of porous sheets that are adhered and layered to each other. Preferably, the substrate reticulate material is one which has open interconnected cells. For purposes of the present invention, the substrate reticulate material, whether a foam, or mesh, or fabric such as a nonwoven fabric, or combination of such materials which may be in layered forms, will usually for convenience simply be referred to as a "reticulated foam". Moreover, use of a reticulated polymeric foam is advantageous for economy. Sometimes herein, the term "reticulated foam" may be shortened to just "foam".

Useful reticulated polymeric foams which may be employed are any of those polymeric substrates which are conventionally used for preparing polymer foams such as polyurethanes, including a polyether-polyurethane foam or a polyester polyurethane foam; polyesters; olefin polymers, such as a polypropylene or polyethylene; vinyl and styrene polymers, and polyamides. Examples of commercially available preferred organic polymer, substrates include polyurethane foams marketed by Foamex International, Inc., including polyether-polyurethane foams, and polyester polyurethane foams.

The foam, as a representative polyurethane foam, may have an average number of pores per inch within a wide range, typically within a range of about 5 to about 120 pores per inch (ppi). The average number of pores per inch is dictated by application. For instance, for an electrode substrate for a nickel-cadmium battery, it may be desirable to utilize a polymer foam having from about 40 to about 110 pores per inch. For a substrate for an engine piston head, it may be desirable to employ a polymer foam having from about 7 to about 45 pores per inch.

The strip 5 may be activated, or provided with some electrical conductivity before electroplating. The term "conductive" is used herein for convenience to refer to an activated product, or one having at least partial conductivity, so as to facilitate subsequent electroplating of the product. A porous product can be made "conductive" employing any of a number of well known procedures such as coating with a latex graphite; electroless plating with a metal such as copper or nickel; coating with an electrically conductive paint, e.g., a paint containing carbon powder, or a metal powder such as silver powder or copper powder; and vacuum deposition of a metal. One suitable electroless plating process is disclosed in the EPO published application 0071119. Coating compositions such as latex graphite can be paints which can contain the carbon black as colloidal dispersions. Polyurethane foams which are conductive by coating with a latex graphite are produced by Foamex International, Inc. These conductive foams typically have a conductivity of about 0.006×1/[ohms·centimeters].

Referring again to the aspect of the invention as shown in FIG. 1, the strip 5 of reticulated foam is fed around a feed roll 10 into an electroplating tank 15, i.e., the strip 5 is moving from right to left in the figure. The tank 15 is maintained to a level 12 with a standard electroplating bath 20. The feed roll 10 is made of a material such as plastic which is inert to the electrolyte of bath 20. The electroplating bath in the tank 15 can be any of a number of conventional electroplating baths capable of electroplating a variety of metals. Such metals include, by way of example, nickel, chromium, zinc, copper, tin, lead, iron, gold, silver, platinum, palladium, rhodium, aluminum, cadmium, cobalt and vanadium. Alloys can be plated in accordance with the present invention, such as brass, bronze, cobalt-nickel alloys, copper-zinc alloys and others. Some metals are not susceptible to electrodeposition from an aqueous medium and require special plating baths. For example, some metals are most commonly electrodeposited from an organic bath or a medium of fused salt. All of such known electroplating baths are conventional in the art and can be used in the practice of the present invention.

Usually hereinafter the discussion of the invention, e.g., as it pertains to the description of the figures, will be detailed in reference to a nickel electroplating bath. This is only for convenience and should not be construed as limiting the invention. One suitable bath successfully employed in the practice of the present invention, which invention utilizing such bath is detailed in the example presented further on hereinbelow, and which is illustrative of this convenient reference to nickel electroplating, is a nickel-sulfamate bath having the following composition, pH and temperature:

| | |
|---|---|
| Nickel sulfamate | 60 oz/gal. |
| Boric acid | 4.0 oz/gal. |
| Anti-pitting agent | 0.05 oz/gal. |
| pH | 3–5 |
| Temperature | 100°–180° F. |

Continuing then with the invention as shown in FIG. 1, the strip 5 of reticulated foam is directed into the bath 20 downward and makes a reverse turn around a lower immersed idler roll 22. The idler roll 22 is made of a dielectric, e.g., plastic, material inert to the electroplate bath. Suitable plastic materials for the rolls 10, 22 are typically nylon, polyvinyl chloride and polypropylene. The strip 5 then travels upward from the idler roll 22 to a first cathode roll 30, which can be made conductive by means of a conventional slip ring (not shown). Both the immersed idler roll 22 and the cathode roll 30 have a small diameter. The cathode roll 30 is positioned outside of the electroplate bath 20. By way of example, it may be spaced about ½ inch from the surface 12 of the bath. Where the electroplating will be nickel electroplating, the cathode roll 30 may be a metal roll, e.g., a contact roller, of nickel, titanium, stainless steel or Hastelloy (registered trademark). As will be understood, the cathode roll 30 is a cathode contact roll 30 whereby the strip 5 will then function as a cathode to receive electroplate. However, for convenience, such roll will generally be referred to herein as the "cathode roll 30" and, similarly, where reference is made herein to an electroplating zone having a cathode, such is to be understood to refer to a roll 30 or like element.

Between the idler roll 22 and the cathode roll 30, the strip 5 of reticulated foam makes a first plating pass past an insoluble anode 35, which is usually in assembly form (FIG. 2), and may thus be referred to as the "anode assembly 35". Thus, the cathode roll 30 and the insoluble anode assembly 35 together define a first electroplating zone 40 in the apparatus. The first zone 40 may sometimes be referred to herein for convenience as the "electroplating stage one" or just the "first zone". The anode assembly 35 is supplied electrically from a source (not shown) through an electrical distributor bar 37, which may be made of a conductive material such as copper. Usually, the insoluble anode assembly 35 will present a broad face to the strip 5 and the strip 5 will proceed past the anode assembly 35 spaced slightly apart from such broad face, e.g., they might be separated by a perforate insulator element (not shown). Such elements are more particularly discussed later on hereinbelow. The plating in the first zone 40 may be limited, as shown in the figure, to one side only of the strip 5, although plating on two sides is contemplated. The plating can also be on the opposite side only of the strip 5 than that shown in the figure by moving the anode assembly 35 on the opposite side of the strip 5 and thus under the cathode roll 30 (thereby assuming a position as shown in FIG. 3).

In the FIG. 1 process, the insoluble anode assembly 35 is generally comprised of one or more anode elements. Suitable insoluble anodes, disclosed as useful in U.S. Pat. No. 2,541,721, for depositing electrolytic nickel from a sulfate bath include non-consumable platinum and platinum alloys, palladium and palladium alloys, gold and tungsten. Also, there can be considered, for providing non-consumable anodes in nickel electroplating, materials such as rhodium and carbon, as discussed in U.S. Pat. No. 4,045,304, or lead as discussed in U.S. Pat. No. 4,859,291, as well as lead oxides, and coated titanium or other valve metals, and including alloys of the foregoing where such exist. Examples of other valve metals which can be coated and serve as non-consumable anodes are tantalum, zirconium, niobium, tungsten and alloys thereof wherein the alloy consists predominantly of at least one of the valve metals. The anode assembly 35 will usually have a substantially planar surface facing the strip 5. The size and width of the anode assembly 35 are optimized for a given application.

The partially plated strip 5 of reticulated foam makes a reverse turn around the cathode roll 30 and is directed downward back into the bath 20 around a second immersed idler roll 38. The strip 5 makes a reverse turn around the idler roll 38 and then a pass in a second electroplating zone, or just "second zone", sometimes referred to herein as "electroplating stage two", defined by a second cathode roll 45 and a second anode 55.

The second anode 55 can comprise a pair of non-consumable baskets 56 which oppose one another across the strip 5 with each basket 56 being adapted to contain a consumable component, e.g., consumable metallic nickel chips (not shown). For convenience, a consumable anode alone or including such an anode 55 as contains a consumable component, may sometimes be referred to herein simply as a "soluble anode" or a "consumable anode". In the specific embodiment depicted in the FIG. 1, the strip 5 of conductive reticulated foam is passed between the baskets 56, which are supplied electrically from a source (not shown) through electrical distributor bars 57. Thus, for the aspect of the invention shown in FIG. 1, in the second zone the strip 5 is plated on both sides. Each anode basket 56 can be an essentially rectangular member in cross section which, for use in the specific bath mentioned above, is usually a basket made of titanium or other valve metal. However, the baskets 56 may be made, at least in part, of a valve metal such as titanium, used together with a polymeric material such as polyethylene, polypropylene, polyvinyl chloride or the like.

A dielectric, imperforate separator 58 of a material inert to the electroplating bath 20 is positioned between the anodes 35, 55. Such a material for the separator 58 may include polyvinyl chloride, nylon, polyethylene, polypropylene and "Teflon" (a registered trademark for polytetrafluoroethylene polymer) or the like, including a metal coated with such polymeric material. The separator 58 extends from the upper level 12 of the bath 20 to a position near the idler roll 38, i.e., below the anode 35. The purpose of the separator 58 is to control the current distribution in the first zone 40 by reducing stray currents from the first anode 35 to later plating stages, e.g., the second electroplating zone defined by the second cathode roll 45 and second anode 55.

Figure 2:
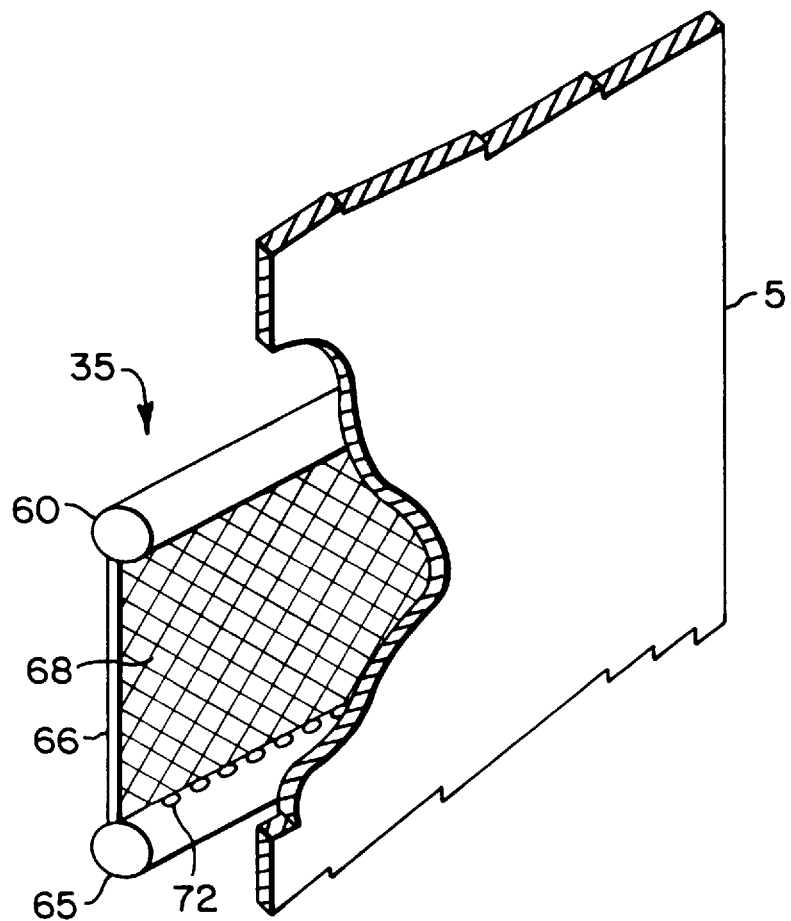
FIG. 2 is a perspective view depicting an insoluble anode, with top and bottom manifolding, useful in the apparatus of FIG. 1, with the anode being positioned adjacent a strip for plating, shown in section and partial cutaway.
Figure 3:
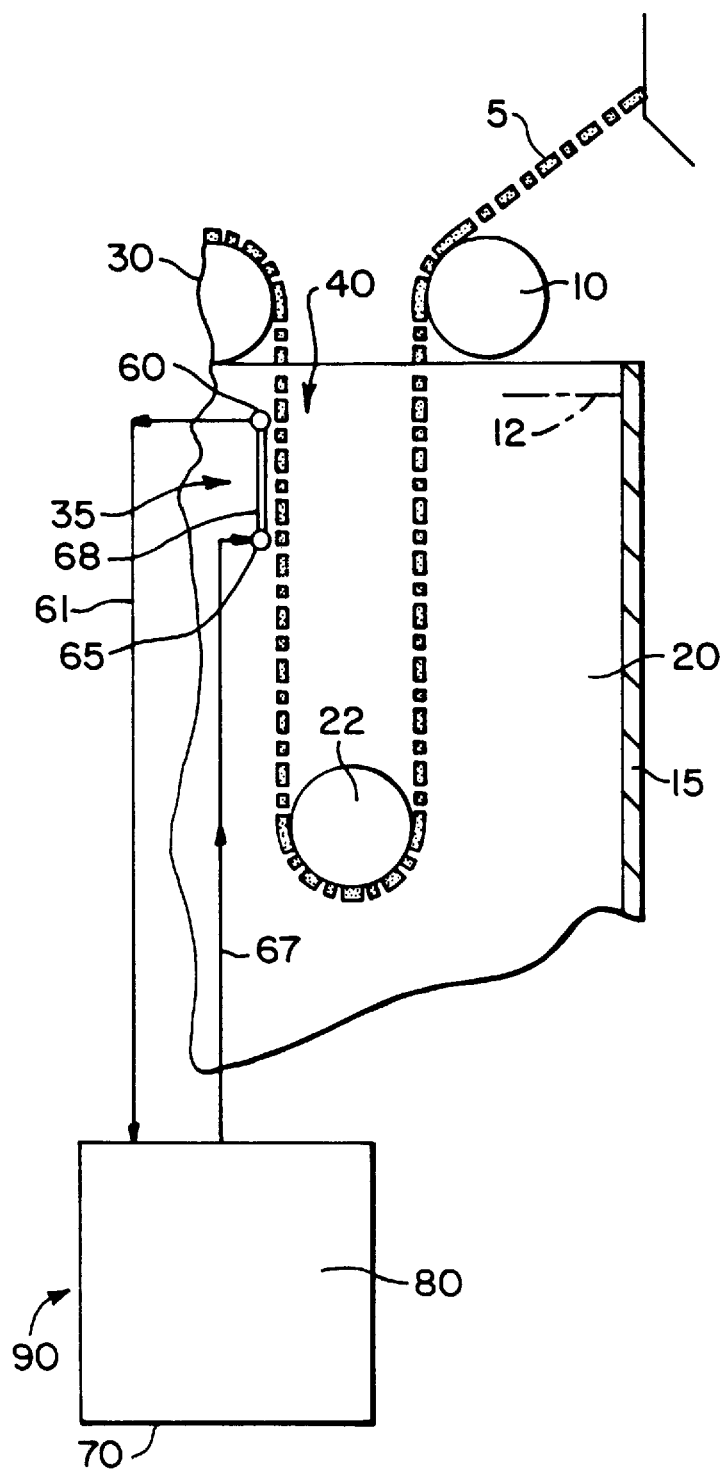
FIG. 3 depicts the first anode zone of FIG. 1 using the insoluble anode of FIG. 2, with electrolyte circulation to a replenishment tank.

Referring then to FIG. 2, there is disclosed a representative insoluble anode assembly 35 that may be used in the practice of the present invention. The insoluble anode assembly 35 comprises a sheet anode 66 of mesh and has a top 60 and bottom manifold 65. The mesh sheet anode 66, e.g., of expanded metal mesh has a broad, flat front face 68. Although this representative mesh sheet anode 66 has a flat front face 68, it will be understood that other configuration is contemplated. Thus, the face 68 could have curvature, e.g., provide a concave curved face facing the strip 5. The mesh sheet anode 66 including its face 68 is perforate. Shown opposite the mesh anode 66 is a strip 5 of reticulated foam. The bottom manifold 65 extends along the lower edge of the mesh anode 66 and contains openings 72 through which electrolyte from a source (not shown) may be introduced. The electrolyte flows upwardly across the flat front face 68 of the mesh anode 66 and through a top manifold 60 which extends along the upper edge of the anode 35. The reticulated foam strip 5 will also generally pass upwardly across the face 68 of the mesh anode 35. Advantageously to provide uniform electrolyte flow across the full face of the strip 5, the openings 72 extend across the bottom manifold 65 at least for the full extent of the width of the strip 5. A similar arrangement is desired for the top manifold 60. Also, the openings 72 are preferably numerous and spaced closely together, to enhance electrolyte flow uniformity, in both manifolds 60, 65.

FIG. 3 shows an electrolyte circulation system such as may be used with the first electroplating zone 40 of FIG. 1. Electrolyte from an electrolytic replenishment zone 90, comprising a tank 70 containing a replenishment bath 80, feeds through a feed line 67 and is introduced into the bottom manifold 65 of an insoluble anode assembly 35 and circulates upwardly across the flat front face 68 of a mesh anode 66 (FIG. 2). At the same time, the strip 5 of reticulated foam, feeding from a source not shown, is conveyed around a feed roll 10 into an electrolyte bath 20 contained in a tank 15, then around an idler roll 22 and passes upwardly across, and closely adjacent, the face 68 of the mesh anode 66. This strip 5 passes beyond the anode assembly 35 out of the bath 20 at its upper level 12 and continues around the cathode roll 30 of the first electroplating zone 40. Electrolyte flowing upwardly across the face 68 of the anode 66 feeds into the top manifold 60 of the insoluble anode assembly 35 and from there flows through a return line 61 to a replenishment bath 80 contained in the tank 70. This circulation of electrolyte from replenishment bath 80 to insoluble anode assembly 35 can assist in the maintenance of the composition of the bath 20.

Although the insoluble anode assembly 35 has been shown in the figures to be positioned as a first anode in an electroplating process, it is contemplated that an insoluble anode may be positioned in other plating zones of a process. Also, although the first plating zone 40 is shown to be shielded from a second or subsequent plating zone, it may be desirable to totally separate the electroplating bath of the first plating zone 40 from subsequent zones. Thus, for example, the electroplating bath 20 as depicted in FIG. 3 may be separate from the second electroplating zone bath. However, the first electroplating zone bath 20 may yet be circulated to a replenishment bath 80 contained in a separate tank 70. Separation of the first zone electroplating bath 20 can be advantageous for providing such a recirculating system with this bath 20. Moreover, where the first electroplating bath 20 is separated from other plating zones, it is contemplated that the bath 20 can be circulated to any one or more of these other plating zones. Such circulation can assist in replenishing the first zone electroplating bath 20. Furthermore, it may also be useful to directly replenish the electroplating bath 20 in the first electroplating zone 40. In this instance, substituents for replenishment can be added directly to the electroplating bath 20.

Where electrolyte is circulating through the first plating zone 40, and also circulating through subsequent plating zones, the rate of circulation of the electrolyte through the first plating zone 40 may be less, e.g., may be at about 25% to 50% of the rate of electrolyte circulating through subsequent plating zones. This slower rate of circulation through the first plating zone 40 can be utilized to assist in optimizing heat transfer between zones. Other parameters can affect the rate of circulation through the first plating zone 40, e.g., plating rate.

Whether electrolyte enrichment is taking place directly in a zone of the plating bath 20 or in a replenishment bath 80, or by circulation to other plating zones, enrichment can be provided by dissolution in the electrolyte of a species providing metal ion to be plated to the bath, which may for instance be by providing a basic metal salt to the bath. Where the electroplating process will be nickel electroplating, the bath 20 or, for example, the replenishment bath 80, can thus be enriched by dissolution in the electrolyte of a substituent such as a basic nickel salt, e.g., nickel carbonate or nickel hydroxide, or it may be enriched by a substituent that is pulverulent nickel such as nickel powder. For most processes, the bath of choice will be an aqueous bath and the replenishment substituent will be a material which dissolves in aqueous medium providing the metal ion for electrodeposition. However, as mentioned hereinbefore, some metals require special plating baths and for such baths a medium other than aqueous medium may be utilized. Where enrichment is by dissolution, e.g., addition of a basic nickel salt such as nickel carbonate to an aqueous nickel electroplating bath, it is contemplated that such can be accompanied by any of the means for assisting solids dissolution in a liquid medium, e.g., agitation, heating or both.

It is also contemplated that the replenishment bath 80 may comprise an electrolytic cell. A replenishment bath electrolytic cell, utilizing nickel electrodes in nickel electroplating has been shown in U.S. Pat. No. 2,541,721. Other disclosures of replenishment procedures for nickel electroplating include U.S. Pat. No. 4,045,304 (nickel pieces in a separate tank for nickel ion supply) and U.S. Pat. No. 4,859,291 (nickel carbonate slurry tank for nickel supply). A replenishment bath comprising an electrolytic cell for use in replenishing an electroplating process also has been shown, for example, in U.S. Pat. No. 5,082,538, the disclosure of which is incorporated herein by reference. As shown therein, a gas diffusion electrode can serve as cathode in the replenishment cell. The anode in the replenishment cell could then be immersed in the cell electrolyte and comprise an assembly such as a valve metal basket with a consumable metal, e.g., nickel metal chips, contained in the basket. Such an anode has been discussed, for example, in U.S. Pat. No. 5,098,544. A gas diffusion electrode is also contemplated to be useful as, for example, in the tank 70 where the replenishment bath 80 is present in an electrolytic cell. In service as a cathode, the gas diffusion electrode will be exposed to a source of gaseous reactant, e.g., air or oxygen. Gas diffusion electrodes have been more particularly disclosed in U.S. Pat. Nos. 4,500,647, 4,877,694 and 4,927,514.

Where the replenishment bath 80 is present in an electrolytic cell, the cell may be a divided or undivided cell, i.e., as a divided cell it can be divided into anode and cathode zones by means of a separator such as a membrane or diaphragm. As a non-separated cell using a gas diffusion electrode as cathode, the anode may be a consumable material. For representative nickel electroplating, this consumable anode may be a non-consumable basket, as of titanium, containing particles of nickel metal. Other suitable anode materials for this undivided cell with a gas diffusion electrode as cathode, with the anode materials being selected depending upon the metal being electroplated, may include, for example, tin, cobalt, iron, chromium, zinc and cadmium. For such cell, as a replacement for a gas diffusion electrode as cathode, other serviceable cathodes may be employed. These can be metal cathodes. Where the electroplating will be nickel electroplating, such metal cathodes include steel, titanium, nickel and alloys thereof. Other metal cathodes can be in intermetallic mixture or alloy form, such as iron-nickel alloy, or alloys with cobalt, chromium or molybdenum, or the metal of the cathode may essentially comprise nickel, cobalt, molybdenum, vanadium or manganese.

Where the replenishment bath 80 is contained in a separated cell, such separator can be an ion exchange membrane. A preferred separator is an essentially air or oxygen impermeable membrane. Commercially available membranes include those made with a perfluorinated copolymer having pendant ion exchange functional groups such as a perfluorocarbon membrane marketed by E. I. Dupont deNemours & Co. under the trademark "NAFION". The separator can also be a porous diaphragm. Examples of suitable porous diaphragms are those made from such compositions as polypropylene, polyvinylidene fluoride and polyvinyl chloride. Of particular interest for the diaphragm is the generally non-asbestos, synthetic fiber diaphragm containing inorganic particulates as disclosed in U.S. Pat. No. 4,853,101. This diaphragm of particular interest comprises a non-isotropic fibrous mat wherein the fibers of the mat comprise 5–70 weight percent organic halocarbon polymer fiber in adherent combination with about 30–95 weight percent of finely divided inorganic particulates impacted into the fiber during fiber formation. A particularly preferred particulate is zirconia. The diaphragm has a weight per unit of surface area of between about 3 to about 12 kilograms per square meter.

With the replenishment bath 80 being in a separated cell, the plating bath 20 could be fed to the anode compartment of the separated cell containing a consumable anode. Water could be fed as bath liquid to the cathode compartment containing a gas diffusion electrode as cathode, or containing a metal cathode, or containing an activated metal cathode. An activated cathode can have a coating on a substrate such as a substrate of titanium or steel. The active surface for the cathode might be a layer of, for example, nickel, molybdenum, or an oxide thereof which might be present together with cadmium. Other metal-based cathode layers can be provided for activated cathodes by alloys such as nickel-molybdenum-vanadium and nickel-molybdenum. Such activated cathodes are well known and fully described in the art.

It is also contemplated that where the representative nickel electroplating will be utilized, but the bath chemistry, rather than predicated on the nickel sulfamate bath as discussed hereinabove, is based predominantly upon nickel chloride, i.e., a nickel chloride bath, there can be used a replenishment bath 80 which is contained in an electrolytic cell. Generally, such electrolytic cell is separated or unseparated. The anode in the cell can be a consumable anode of nickel metal and the cathode can be a gas diffusion electrode, or any of the other cathodes as discussed hereinabove, for an unseparated cell. Such a nickel chloride bath could evolve chlorine at the plating bath anode. It is contemplated that this chlorine could be removed from the plating zone, reacted with nickel metal to form nickel chloride which could be solubilized and utilized in the plating bath. For nickel electroplating, in addition to such nickel chloride bath and the above discussed nickel-sulfamate bath, there may also be utilized, the mention of which has been presented hereinbefore, a nickel sulfate bath, e.g., a Watts bath.

In a representative process wherein nickel electroplating will be employed, the first plating zone 40 having an insoluble anode assembly 35 will typically have a bath 20 maintained at a pH in the range from about 2 to about 4. Moreover, temperature for the bath 20 in such first plating zone 40 will typically be maintained within a range from about 40° C. to about 70° C. Then, the second plating zone having a consumable anode can have an electroplating bath maintained at a pH within the range from about 3 to about 4 and a bath temperature maintained within the range from about 40° C. to about 70° C. Usually, the first plating zone 40 for such representative process, when containing an insoluble anode assembly 35, is most serviceably operated for processing efficiency at a voltage within the range from about 20 volts to about 35 volts. Then, for such a representative process where there is a soluble anode in the second plating zone, such zone is desirably operated for economy at a voltage within the range of from about 10 volts to about 20 volts. In such a representative process, if oxygen is evolved at the first plating zone insoluble anode, dissolution of nickel carbonate in a replenishment bath can not only be serviceable for nickel replenishment, but may also facilitate maintenance of pH in the first plating zone in the range from about 2 to about 4.

Reference can be made to U.S. Pat. No. 5,098,544, the disclosure of which is incorporated herein by reference, for a general understanding of apparatus useful in, and the operation of, a multi-zone electroplating process. For example, reference can be made to such patent for an understanding of a basket anode, i.e., an anode comprising a non-consumable basket filled with consumable chips, such as consumable nickel chips. It is contemplated that when there is mentioned herein a combination anode comprising an insoluble member plus soluble anode elements, that such will be an insoluble basket containing particulate metal elements in the manner as disclosed in the U.S. Pat. No. 5,098,544.

It is preferred, such as for circulation of electrolyte through the anode, that the insoluble anode be a perforate anode such as the mesh anode 66 of FIG. 2. However, the use of perforate anode members other than an expanded metal mesh, e.g., screens including woven wire screens, perforated plates, assemblies of louvers and blades, including blades in grid form, is contemplated. An electrode that is apertured, having blades in grid form, has been shown in U.S. Pat. No. 4,022,679. Use of members such as assemblies of louvers and blades can be useful to direct electrolyte flow or gas flow, including gas flow from gas which can be released from the anode during electrolysis. Also, particularly where the anode is perforate and used such as in zone one which may be separated from subsequent plating zones, it is contemplated that the anode can be used in conjunction with a flowing electrolyte. The electrolyte might flow with or against the path of travel of the strip 5, or flow through the perforate anode against the strip 5. Such arrangements have, for example, been summarily disclosed in U.S. Pat. No. 4,601,794. Moreover, it is contemplated that the insoluble anode, such as used in a plating zone, e.g., zone one, can be a gas diffusion electrode. In such instance, when serving as an anode, this electrode would be fed a gaseous reactant such as hydrogen or $SO_2$. Also, the gas diffusion electrode utilized in the plating zone could be configured to serve in the manner of a bipolar electrode. In this configuration, it could have a central impermeable barrier separating an anodic side and a cathodic side. The anodic side could have a surface area, e.g., a major face of the gas diffusion electrode, facing the strip 5. This anodic side would be fed a gaseous reactant such as hydrogen or $SO_2$. The cathodic side could also have an area such as an electrode major face which would face away from the strip 5. For the overall electrode to function as a bipolar electrode, this gas diffusion electrode cathodic side would be exposed to a gaseous reactant feed such as oxygen or air. Where the gas diffusion electrode is present in the plating zone as a bipolar electrode, it could be present together with a consumable anode in the zone.

For some applications, it may be desirable that the electrolyte circulate, rather than upwardly across the face 68 of a perforate anode 66, through the perforate anode 66 and through the conductive reticulated foam strip 5, as mentioned hereinabove. This would be electrolyte circulation in a manner horizontal to the positioning of the elements in FIG. 2, rather than a vertical circulation as hereinabove described in connection with the figure. Such horizontal circulation of electrolyte may be useful for providing desirable ejection of any gas formed, where the plating operation may provide such formation, as well as maintain positioning of the foam strip 5.

Where electrolyte circulation is a vertical circulation and manifolding has been used as described in FIG. 2, along with or in addition to the circular opening 72 as depicted in the figure, the manifolds may be provided with slotted apertures. Suitable manifolding including both circular openings and slotted apertures has been depicted, for example, in U.S. Pat. No. 4,601,794. It is advantageous for such vertical circulation that the total open area of apertures in the top manifold 60 be enlarged over the total area provided by the apertures in the bottom manifold 65. Such can be provided, for example, by utilizing the same number of holes in both top and bottom manifolds 60, 65 but by employing enlarged holes for the top manifold 60. Or the top manifold 60 can have a greater number of holes, or be slotted with an open area exceeding the open area of the holes or slots in the bottom manifold 65. If the electrolytic process will be accompanied by gas release at the anode, e.g., oxygen evolution on the flat front face 68 of the mesh anode 66, the enlarged apertures of the top manifold 60 can provide not only for the removal of the same amount of electrolyte away from the anode 66 that is feeding from the bottom manifold 65, but can also allow for removal of the gaseous component generated at the anode 66. Furthermore, the top manifold 65 can sweep away even additional electrolyte, i.e., remove more electrolyte than is fed through the bottom manifold 65. This sweeping away of additional electrolyte through the top manifold 60, may provide desirable characteristics such as reducing electrolyte resistance, e.g., reducing the gas void fraction in operations leading to gas formation at the anode.

Where such enhanced flow of electrolyte out of the top manifold 60 is utilized, additional electrolyte 20 can be provided to the plating zone 40, such as by sparging additional make-up electrolyte into the plating zone 40.

As mentioned hereinbefore, the anode assembly 35 may be spaced slightly apart from the strip 5 by a perforate insulator element. Such an element may protrude from the face of the insoluble anode 35, usually by spaced-apart insulating members which can take various forms, e.g., a punched sheet providing a grid form element. Also, U.S. Pat. No. 4,936,971 discloses useful insulating members as dielectric spacing members which extend beyond an anode surface, in parallel, spaced-apart rows. Further, such insulator elements may be insulator strings or tubes which could be woven into an anode mesh to project beyond the mesh, as in a parallel row or pattern including a chevron pattern or bias positioning, i.e., a diagonal pattern. As will be understood, the patterning can provide for the perforate nature of the insulator element. Furthermore, the insulator elements may be in the form of buttons or snaps which can be compressively inserted into perforations, e.g., the perforations in a perforated plate anode or into diamond pattern apertures of a mesh anode. Any such spacing system of insulator members, e.g., a perforate element such as a punched plate grid or spaced elements providing a perforate nature by patterning, is contemplated for use. The material for such members will typically be a plastic such as useful for the imperforate separator 58 and including polyethylene, polypropylene or halogenated resin, e.g., polytetrafluoroethylene or the like, as well as include metals coated with such plastic materials.

For the insoluble anode, and particularly for a perforate insoluble anode such as the mesh anode 66 of FIG. 2, when used in the representative process wherein the above-described nickel sulfamate bath is utilized for electrodeposition, the anode can comprise a valve metal substrate with an electrochemically active coating. As a characteristic of using this anode in such operation, this anode will be a gaseous oxygen evolving anode. As representative of the electrochemically active coatings that can be used with an anode, e.g., as a coating on the metal anode 66, are those provided from platinum or other platinum group metals or they can be represented by active oxide coatings such as platinum group metals, magnetite, ferrite, cobalt spinel or mixed metal oxide coatings. Such coatings have typically been developed for use as anode coatings in the industrial electrochemical industry. They may be water based or solvent based, e.g., using alcohol solvent. Suitable coatings of this type have been generally described in one or more of the U.S. Pat. Nos. 3,265,526, 3,632,498, 3,711,385 and 4,528,084. The mixed metal oxide coatings can often include at least one oxide of a valve metal with an oxide of a platinum group metal including platinum, palladium, rhodium, iridium and ruthenium or mixtures of themselves and with other metals. Further coatings include tin oxide, manganese dioxide, lead dioxide, cobalt oxide, ferric oxide, platinate coatings such as $M_xPt_3O_4$ where M is an alkali metal and x is typically targeted at approximately 0.5, nickel—nickel oxide and a mixture of nickel and lanthanum oxides, such as lanthanum nickelate. If chlorine is present in the electrolyte, such as chloride ion from a nickel chloride constituent in nickel electroplating from a Watts bath, a coating such as an iridium oxide based coating could be selected to reduce, or eliminate, the evolution of chlorine gas during electrolysis.

For many applications, the reticulated foam strip 5 will be electroplated, as with one or more of copper, nickel, zinc, cobalt, tin, iron or their alloys. Where the resulting electroplated foam is to be later used, such as for the matrix of a battery electrode, the plated structure is typically subjected to pyrolysis or combustion. Pyrolysis or combustion is usually undertaken for decomposing and removing, as by burning, initial reticulated material, e.g., substrate polymeric foam, and can also remove a coating on the foam such as from a colloidal dispersion of carbon black. Typically, pyrolysis will be conducted at a temperature in the range from about 500° C. to about 900° C. for a few minutes, e.g., 1–5 minutes, although longer pyrolysis times such as up to three hours may be used, depending upon the initial matrix material. Such procedure can be followed by annealing, using conventional annealing techniques to, for example, improve product ductility. For instance, if the electroplating has been nickel electroplating, annealing can taken place in a hydrogen environment at about 800° C. to about 1200° C. for a few minutes, such as 6–12 minutes, although longer times up to about 30 minutes may be employed. Procedures for nickel electroplating of an initially conductive foam, as well as subsequent pyrolysis and annealing, have been taught, for example, in U.S. Pat. No. 5,098,544.

The present invention will be disclosed in additional detail in the following Example. In this Example, all parts, percentages and ratios are by weight unless otherwise indicated. All metal concentrations were determined using standard atomic absorption techniques.

EXAMPLE

A polyurethane foam substrate was used which was made conductive with a carbon based paint. The conductive polyurethane foam was produced by Foamex International, Inc. The foam was electrolytically plated in the apparatus of FIG. 1 using the insoluble anode assembly of FIG. 2. In this Example, only two cathode rolls 30, 45 were used. The insoluble anode assembly 35 had an 0.08 inch expanded titanium metal mesh sheet anode 66 (mesh of 0.08 inch thickness and 0.08 inch strand width) with the LWD and SWD of an aperture of this mesh being ½ inch and ¼ inch, respectively. The active area of the anode mesh 66 was a rectangular "window" of 406 square centimeters, which was defined by a 1/16 inch thick polypropylene mask having top, bottom and side portions defining the window, plus an additional two ¼ inch wide strips of the mask across the face of the mesh. The active face of the anode was provided with an electrochemically active oxide coating of tantalum oxide and iridium oxide having a 65:35 weight ratio of Ir:Ta, as metal. The coating composition was an aqueous, acidic solution of chloride salts, and the coating was applied in layers, each layer being baked in air at 525° C. for ten minutes. The conductive foam had the following characteristics:

| Characteristic | Value |
| --- | --- |
| Width of strip | 12 inches |
| Thickness of strip | 0.065 inch |
| Conductivity | 0.0054 × 1/[ohms · centimeters] |
| Pores per inch | 110 |

Electroplating was carried out at a line speed of about three inches per minute. The electrode gap between the foam strip and insoluble anode was 0.062 inch. To maintain this gap, a ¼ inch plate of modified polyphenylene ether thermoplastic was installed at the back of the path of travel of the strip. The plate had two large 3.5 inch×4.6 inch openings cut opposite the anode face, to allow electrolyte flow through the plate. The following Table 1 gives currents and voltage drops in the two plating zones.

TABLE 1

| Zone | Current | Voltage |
|------|---------|---------|
| 1 | 130–160 amps | 14 volts |
| 2 | 690 amps | 14 volts |

The zone 1 voltage would have desirably been greater, e.g., 20 volts or more, but the operational 14 volts used was necessitated by equipment limitations. The electroplate bath was a nickel-sulfamate bath having the composition presented hereinabove before the description of the example, and was maintained at a pH of about 3.7 and temperature of about 55° C. In using the insoluble anode assembly of FIG. 2, electrolyte at a rate of about 5 gallons/minute (gal/min) was directed out of the bottom manifold 65 and into the top manifold 60. Also, electrolyte from zone 1 from the top manifold 60 was circulated to a replenishment tank 70 as shown in FIG. 3. In the tank, nickel carbonate was solubilized at a rate of about 2 grams/minute (g/min) and the recirculation flow from the tank 70 to zone 1 reached a steady state of about 3.5 gal/min. The nickel chips in basket 58 were sulfur depolarized electrolytic grade nickel. The resulting nickel plating was about 638 grams per square meter of foam substrate. The plated foam was then subjected to pyrolytic treatment in air, as well as subsequent annealing in hydrogen, which is a standard practice and has been disclosed, for example, in U.S. Pat. No. 5,098,544.

A sample of the resulting reticulated nickel foam, of a size approximately one inch by six inches, was then inserted in a Tinius Olsen Series 1000 tensile tester for tensile strength testing. Testing was conducted on six samples. In this tensile test, the samples were also evaluated for elongation at break. For such elongation, the samples were stretched with the tensile test apparatus and the elongation is the distance traveled. Properties for the foam, including weight as well as tensile strength and elongation were found to be comparable to foam produced when using a soluble anode in zone 1.

We claim:

1. In a process for continuously electroplating a strip of reticulated foam and providing electroplated foam of improved weight distribution, in which process multiple electroplating zones are provided and each zone has an electroplating bath, a cathode and an anode and with the reticulated foam being introduced into the electroplating bath and guided in a path of travel past the anode and cathode of each electroplating zone, the improvement comprising:
   (a) providing a cathode roll outside of said electroplating bath as a cathode;
   (b) positioning an insoluble anode as a sole anode in a first electroplating zone for said electroplating process;
   (c) positioning at least one soluble anode within one, but less than all, of the electroplating zones of said electroplating process;
   (d) separating the electroplating bath of said first electroplating zone from the electroplating bath of subsequent electroplating zones;
   (e) guiding said reticulated foam in said electroplating bath in a path of travel past both said insoluble anode and said soluble anode, and past said cathode roll positioned outside of said electroplating bath; and
   (f) removing electroplated conductive reticulated foam of improved weight distribution from said electroplating bath.

2. The process of claim 1 wherein there is positioned an insoluble anode within said electroplating bath of said first electroplating zone and said insoluble anode and cathode roll define a first electroplating zone within said bath.

3. The process of claim 2 further comprising evolving gaseous oxygen in said first electroplating zone within said bath.

4. The process of claim 2 wherein said subsequent electroplating zones contain said soluble anodes and said first electroplating zone containing said insoluble anode is electrically shielded from said subsequent electroplating zones.

5. The process of claim 2 wherein said first electroplating zone containing said insoluble anode is operated at a voltage within the range of from about 20 to about 35 volts, there is established a second electroplating zone containing a soluble anode, and said second electroplating zone is operated at a voltage within the range of from about 10 to about 20 volts.

6. The process of claim 5 wherein said first electroplating zone has an electroplating bath maintained at a pH within the range from about 2 to about 4 and at a bath temperature maintained within the range from about 40° C. to about 70° C., and wherein said second electroplating zone has an electroplating bath maintained at a pH within the range from about 3 to about 4 and a bath temperature maintained within the range from about 40° C. to about 70° C.

7. The process of claim 6 wherein said first electroplating zone electroplating bath pH, and electrolyte enrichment for said zone, are provided by replenishment with basic nickel salt.

8. The process of claim 2 wherein there is provided in said first electroplating zone a single insoluble, perforate anode member in plate form having at least one flat major face and at least one of said subsequent electroplating zones has a combination anode comprising an insoluble member plus soluble anode elements.

9. The process of claim 8 wherein there is provided in said subsequent electroplating zone a combination anode of an insoluble valve metal basket member containing soluble nickel particulate elements.

10. The process of claim 8 wherein the electroplating bath in said first electroplating zone is circulated through said reticulated foam strip and through said perforate anode member.

11. The process of claim 2 wherein said insoluble anode is positioned in the electroplating bath at an upper surface of the electroplating bath and said strip travels upwardly within said bath past said insoluble anode and outside of said bath onto said first cathode roll.

12. The process of claim 11 wherein said electroplating bath is circulated in a path of travel upwardly with said strip.

13. The process of claim 1 wherein said electroplating bath of said first electroplating zone is circulated from said first electroplating zone to at least one of said subsequent electroplating zones.

14. The process of claim 13 wherein said first electroplating zone has said electroplating bath circulating therethrough in an amount within the range of from about 25% to about 50% of an amount of said electroplating bath circulating through subsequent electroplating zones.

15. The process of claim 1 wherein said electroplating bath of said first electroplating zone is circulated to a replenishment bath for enriching said electroplating bath of said first electroplating zone and said electroplating bath of said replenishment bath is recirculated to said first electroplating zone.

16. The process of claim 15 wherein the electroplating bath enrichment is provided in said replenishment bath by dissolving a basic nickel salt including nickel carbonate or nickel hydroxide, or by pulverulent nickel in said bath.

17. The process of claim 15 wherein said replenishment bath is provided in an electrolytic cell and said cell is a separated cell having a separator member.

18. The process of claim 17 wherein there is positioned in said replenishment bath electrolytic cell a gas diffusion electrode as cathode.

19. The process of claim 1 wherein there is provided as said insoluble anode an anode of one or more of platinum, silver, graphite, lead, lead oxides, valve metal, and alloys thereof.

20. The process of claim 19 wherein said insoluble anode comprises an oxygen evolving anode of a valve metal substrate having a coated metal surface.

21. The process of claim 20 wherein said coated metal surface contains a platinum group metal, a metal oxide or mixtures thereof.

22. The process of claim 21 wherein said coated metal surface contains at least one metal oxide selected from the group consisting of platinum group metal oxides, magnetite, ferrite, cobalt oxide spinel, tin oxide, a mixed crystal material of at least one oxide of a valve metal and at least one oxide of a platinum group metal, one or more of manganese dioxide, lead dioxide, platinate substituent, nickel—nickel oxide and mixture of nickel and lanthanum oxides.

23. In a process for continuously electroplating a strip of reticulated foam and providing electroplated foam of improved weight distribution, in which process multiple electroplating zones are provided and said reticulated foam is introduced into an electroplating bath and guided in a path of travel past an anode and a cathode operating in each electroplating zone, the improvement in said process and the operation of said anode comprising:

(a) providing an insoluble gas diffusion electrode as a sole anode in a first electroplating zone for said electroplating process;

(b) feeding a gaseous reactant to said gas diffusion electrode in said electroplating zone;

(c) establishing at least one soluble anode within one, but less than all, of the electroplating zones for said electroplating process;

(d) guiding said reticulated foam in said electroplating bath in a path of travel past both said insoluble anode and said gas diffusion electrode; and (e) removing electroplated conductive reticulated foam of improved weight distribution from said electroplating bath.

24. The process of claim 23 wherein there is provided as said gas diffusion electrode a bipolar electrode in said electroplating zone.

25. The process of claim 24 wherein said bipolar gas diffusion electrode has an anodic side, said reticulated foam is guided past said gas diffusion electrode anodic side, and said anodic side is exposed to a source of gaseous reactant of one or more of hydrogen or $SO_2$.

26. The process of claim 24 wherein said bipolar gas diffusion electrode has a cathodic side and said cathodic side is exposed to a source of gaseous reactant of one or more of air or oxygen.

27. The process of claim 23 wherein said gas diffusion electrode is exposed to a source of gaseous reactant of one or more of hydrogen or $SO_2$.

28. In a process for continuously electroplating a strip of reticulated foam and providing foam of improved weight distribution, in which process multiple electroplating zones are provided and each zone has an electroplating bath electrolyte, a cathode and an anode and with the reticulated foam being introduced into the electroplating bath electrolyte and guided in a path of travel past the anode and cathode operating in each electroplating zone, the improvement in said process and in anode operation comprising:

(a) providing a perforate, insoluble anode having a front face in at least one electroplating zone;

(b) introducing the electrolyte into an electroplating zone containing said insoluble anode along a bottom edge of said insoluble anode;

(c) flowing the electrolyte introduced at said bottom edge across the front face of said insoluble anode;

(d) removing the electrolyte passing along the front face of said insoluble anode at a top edge of said anode; and (e) guiding said reticulated foam in said electrolyte in a path of travel past the front face of said insoluble anode and into contact with the electrolyte flowing across the front face of said insoluble anode.

29. The process of claim 28 further comprising evolving gaseous oxygen along a flat front face of said insoluble anode.

30. The process of claim 28 comprising removing the electrolyte from said top edge of said insoluble anode and circulating the same to at least one subsequent electroplating zone.

31. The process of claim 30 comprising removing electrolyte from the top edge of said insoluble anode and circulating the same to a replenishment zone for enriching electrolyte of said electroplating zone.

32. The process of claim 31 wherein electrolyte from said replenishment zone is recirculated to said electroplating zone having said insoluble anode.

33. The process of claim 28 wherein said electrolyte introduced at said bottom edge flows upwardly past the front face of said anode and said strip of reticulated foam also passes upwardly past said front face of said insoluble anode.

34. The process of claim 33 wherein said electrolyte flows upwardly along said strip of reticulated foam from apertures in a manifold at said bottom edge.

35. The process of claim 28 wherein said strip of reticulated foam is guided from said electrolyte in a path of travel past said insoluble anode to a cathode roll positioned outside of said electroplating bath.

36. The process of claim 28 wherein said strip of reticulated foam is guided across a front face of a perforate insulated grid means spaced between the front face of said insoluble anode and said strip of reticulated foam.

37. The process of claim 28 wherein said electrolyte removed at said top edge exceeds the electrolyte introduced at said bottom edge and additional electrolyte is provided to said electroplating zones by circulating the additional electrolyte from a replenishment zone to said electroplating zones or sparging the additional electrolyte to said electroplating zones, or both.

* * * * *